(12) United States Patent
Katagiri et al.

(10) Patent No.: US 7,200,333 B2
(45) Date of Patent: Apr. 3, 2007

(54) OPTICAL COMMUNICATION APPARATUS, SYSTEM, AND METHOD THAT PROPERLY COMPENSATE FOR CHROMATIC DISPERSION

(75) Inventors: Toru Katagiri, Kawasaki (JP); Hiroaki Tomofuji, Kawasaki (JP); Hiroshi Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 644 days.

(21) Appl. No.: 09/962,164

(22) Filed: Sep. 26, 2001

(65) Prior Publication Data
US 2004/0001715 A1 Jan. 1, 2004

(30) Foreign Application Priority Data
Jun. 5, 2001 (JP) ............................. 2001-170206

(51) Int. Cl.
*H04J 14/02* (2006.01)
*H04B 10/12* (2006.01)
*H04B 10/00* (2006.01)

(52) U.S. Cl. ............................ 398/81; 398/82; 398/92; 398/148; 398/157

(58) Field of Classification Search ................. 398/81, 398/82, 92, 147, 157, 148, 65; 359/334, 359/337.5, 341.3
See application file for complete search history.

(56) References Cited

U.S. PATENT DOCUMENTS 5,898,714 A * 4/1999 Morita et al. .................. 372/6
6,292,288 B1 * 9/2001 Akasaka et al. ............ 359/334
6,342,965 B1    1/2002 Kinoshita .................... 359/334
6,621,621 B1 * 9/2003 Jones et al. ............ 359/337.11
6,621,625 B1 * 9/2003 Zhang et al. ........... 359/341.42
6,731,877 B1 * 5/2004 Cao ............................. 398/91
2002/0048439 A1 * 4/2002 Tsukitani et al. ............ 385/123
2002/0118934 A1 * 8/2002 Danziger et al. ............ 385/122
2004/0252999 A1 * 12/2004 Onaka et al. ................ 398/177

FOREIGN PATENT DOCUMENTS

| DE | 199 10 041 A1 | 8/2000 |
|---|---|---|
| EP | 0 903 877 A2 | 3/1999 |
| EP | 0 903 877 A3 | 3/1999 |
| JP | 9-179152 | 7/1997 |
| JP | 2000-78081 | 3/2000 |
| WO | 99/43107 | 8/1999 |
| WO | 99/66607 | 12/1999 |

OTHER PUBLICATIONS

Emori, Y., et al., "Broadband lossless DCF using Roman amplification pumpted by multichannel WDM laser diodes"., Electronics Letters, Oct. 29, 1998, vol. 34, No. 22.
Morita, I., "40 Gbit/s single-channel transmission over standard singlemode fibre using distributed Roman amplification", Electronics Letters, Dec. 7, 2000, vol. 36, No. 25.

* cited by examiner

*Primary Examiner*—Dalzid Singh
(74) *Attorney, Agent, or Firm*—Staas & Halsey LLP

(57) ABSTRACT

An optical communication apparatus performs wavelength division multiplexing with respect to signals of a plurality of signal transmission bands. The apparatus includes a first optical unit which effects distributed Raman amplification and has a characteristic that compensates for dispersion of a transmission path to which the optical communication apparatus is connected, with respect to at least one of the signal transmission bands.

31 Claims, 15 Drawing Sheets

OPTICAL COMMUNICATION APPARATUS, SYSTEM, AND METHOD THAT PROPERLY COMPENSATE FOR CHROMATIC DISPERSION

BACKGROUND OF THE INVENTION

1. Field of the Invention

Because of an explosive increase of IP (Internet Protocol) traffic, there is a rapidly increasing demand for a low cost transmission system having a large capacity. Such a demand may well be responded to by further increasing the capacity and reducing the cost of a WDM (wavelength division multiplexing) transmission system. In respect to the WDM transmission system, the following issues are being addressed as means to further increase the transmission capacity:

(1) achieving a higher transmission rate per wavelength;
(2) high-density wavelength division multiplexing with a narrower interval of signal wavelength placement;
(3) WDM transmission using a plurality of signal wavelength bands (for example, a 1.55-micrometer band (C band) and a 1.58-micrometer band (L band)); and
(4) realization of wider bands by exploiting a new signal wavelength band (for example, an S-band situated in the range of shorter wavelengths than the C-band or an $L^+$-band situated on the side of longer wavelengths than the L-band).

The item (1) is an approach which aims at achieving a larger capacity by raising a signal bit rate per wavelength, and the items (2)–(4) are approaches which aim at achieving a higher capacity by increasing the number of signal wavelengths (i.e., the number of multiplexed wavelengths). As for the issue of cost reduction, a reduction in the number of 3R relays that include an electric-photo-electric conversion is being considered. Namely, optical amplification relaying may be achieved by exclusively using optical amplifiers that are equipped with rare earth-element doped fibers (e.g., erbium doped optical fibers).

When an attempt is made to achieve such a WDM transmission system, a problem arises in that the transmission distance and data-transmission capacity will be limited by limitation factors such as noise generated by optical-fiber amplifiers, chromatic dispersion of optical fibers, polarization mode dispersion (PMD), and accumulation of waveform distortion caused by a nonlinear effect.

The present invention relates to a method of compensating for chromatic dispersion of an optical-fiber transmission path where the method achieves long-distance large-capacity optical transmission in a WDM transmission system.

2. Description of the Related Art

Optical pulses have a wide spectrum in the frequency region when these pulses are generated by controlling the drive current of a light source for outputting light of a given wavelength or when these pulses are generated by modulating intensity of continuous light output from a light source of a certain wavelength by use of an external modulators such as LN (LiNbO3:lithium niobate) modulator. When such optical pulses propagate through an optical fiber having such chromatic dispersion characteristics that the velocity of light propagation is dependent on wavelength, the waveform of optical pulses will be distorted. An effective measure to mitigate the influence of such chromatic dispersion is to control the chromatic dispersion of the optical fiber such as to adjust the dispersion of optical signal wavelengths to almost zero.

A wavelength used for optical transmission of today is approximately 1.55 micrometer, which is the wavelength band used by an optical-fiber amplifier that employs rare earth doped fibers and can directly amplify an optical signal without converting light. In the single mode optical fiber (SMF) that is widely used today, however, zero dispersion wavelength exists around $\lambda=1.3$ micrometer. In consideration of this, a dispersion compensation technology that is generally used combines "an SMF used as a transmission path" with "a dispersion compensation fiber (DCF) that has the chromatic dispersion and dispersion slope characteristics of inverse signs relative to the SMF". Through this combination, the dispersion compensation technology controls an average dispersion of the SMF+DCF in the longitudinal direction to be zero in the signal wavelength band. The WDM transmission-system configuration using this technology is shown in FIG. 1.

FIG. 1 shows an example of a conventional WDM transmission system. The WDM transmission system shown in this illustration includes an optical transmitting apparatus 100, an optical receiving apparatus 200, the optical relaying apparatus 300, and optical transmission lines 400 that connect between these apparatuses.

Light of various wavelengths is output from optical transmitters (OS) 11 provided in the core or the exterior of optical transmitting apparatus 100, and is input, via optical variable attenuators (Variable ATT) 12 for adjusting the input power of optical signals, to multiplexers (MUX) 13, which multiplex the light of various wavelengths. Light of various wavelengths is multiplexed separately for each signal wavelength band (for example, C-band, L-band, and so on). The WDM light signal of each signal wavelength band is amplified by a corresponding erbium-doped fiber amplifier (EDFA) unit 17, which employs an optical fiber with erbium doped therein as a rare earth material. In FIG. 1 and other figures, reference numbers are given to the component parts of only one signal wavelength band for the sake of convenience.

An example of a configuration of a conventional optical amplifier is shown in FIG. 2. The conventional optical-amplifier unit 17 has a configuration in which a dispersion compensation fiber (DCF) 16 having the dispersion and dispersion slope characteristics of reverse signs relative to the transmission-line fibers 400 is provided between the EDFA 14 and the EDFA 15 forming a two-stage configuration. Moreover, FIG. 2 shows an example of a configuration of the EDFA 14. The EDFA 15 has the same configuration as that shown in FIG. 2. The EDFA 14 includes two EDFs, two pump light sources which output pump light, a WDM coupler, an isolator, an attenuator, etc. In this configuration, since the maximum input power to the DCF 16 has to be limited in order to suppress the influence of waveform distortion that is caused by a nonlinear effect generated in DCF 16, the output power of the EDFA 14 situated at the first stage cannot exceed an output power of a certain fixed level. When loss through the DCF 16 becomes large, therefore, an OSNR degradation at the EDFAs 14 and 15 becomes conspicuous, thereby causing a degradation in the optical transmission characteristics of the entire system in addition to various other degradation factors.

Light output from the EDFA 15 of each signal wavelength band is multiplexed by the optical coupler (BAND MUX) 18 that multiplexes light of various signal wavelength bands, followed by propagating into the transmission-line fiber 400. An optical coupler 31 is connected to the output end of the transmission-line fiber 400 accommodated in the optical relaying apparatus 300. Through the optical coupler 31, a pump light source (pump LD) 32 supplies pump light for the purpose of distributed Raman amplification (DRA) that utilizes the transmission-line fiber 400 as an amplification medium by making use of stimulus Raman scattering (SRS). The light that propagates through the transmission-line fiber 400 is thus amplified by DRA, and is input to the optical relaying apparatus 300 situated halfway through the extension of the transmission-line fiber 400.

The light input to the optical relaying apparatus 300 is supplied to optical amplifiers 37 each having a two-stage configuration for a corresponding signal wavelength band, after passing though a band demultiplexer (BAND DEMUX) 33, which demultiplexes the WDM light signal into each wavelength band. Each amplifier 37 is equipped with a DCF 36 between two stages of EDFAs 34 and 35 where the DCF 36 has chromatic dispersion characteristics of reverse signs relative to the transmission-line fiber 400. Light output from the EDFA 35 of each signal wavelength band is multiplexed by a multiplexer 38, and is then input to the transmission-line fiber 400 again.

The light having propagated through the transmission-line fiber 400 while being amplified by DRA is input to the optical receiving apparatus 200, and passes through an optical coupler 21, followed by being demultiplexed into each wavelength band by a demultiplexer 23. Then, the light passes through an amplifier unit 27 having a two-stage configuration comprised of EDFAs 24 and 25, and is input to a demultiplexer (DEMUX) 28, which demultiplexes the light into each wavelength. Light demultiplexed into each wavelength by the demultiplexer 28 is input to and received by an optical receiver 29 of a corresponding wavelength. Through the coupler, a pump light source (pump LD) 22 supplies pump light for the purpose of distributed Raman amplification that utilizes the transmission-line fiber 400 as an amplification medium by making use of stimulus Raman scattering. Accordingly, light that propagates through the transmission-line fiber 400 is amplified by DRA, and is input to the optical receiving apparatus 200 situated at the end of the transmission-line fiber 400.

FIG. 3 shows a schematic diagram of a method of compensating for dispersion. Here, analysis is directed to the accumulated dispersion of a configuration enclosed in a box illustrated in FIG. 3. A graph also shown in FIG. 3 illustrates the accumulated dispersion characteristics of an SMF and a DCF (for C-band or L-band) and those of SMF+DCF. As shown in FIG. 3, the chromatic dispersion characteristics of widely used optical fibers have a characteristic curve showing gradual changes in relation to wavelength. That is, the slope (dispersion slope) of dispersion characteristics is different for each signal wavelength band (C-band, L-band, etc.). Moreover, it is extremely difficult to create DCF that has chromatic dispersion and dispersion slopes of reverse signs relative to transmission-line fibers across all wavelength bands. Accordingly, as shown in FIG. 3, a method generally employed today compensates for chromatic dispersion of transmission paths separately for each signal wavelength band or on a wavelength-specific basis.

As described above, it is possible to bring to zero a total accumulated dispersion of SMF+DCF (as shown by "total" in the FIG. 3) by using a DCF ("DCF for C-band" or "DCF for L-band" in FIG. 3) that has chromatic dispersion characteristics of reverse signs relative to the chromatic dispersion characteristics of an SMF (shown as "SMF" in FIG. 3). Since it is extremely difficult to manufacture DCF that has the chromatic dispersion characteristics of reverse signs relative to transmission-line fibers, however, some residual dispersion may remain in reality.

In conventional optical-wavelength-division-multiplexing systems, transmission-line dispersion is compensated for as described above, thereby suppressing signal waveform degradation caused by chromatic dispersion. In such systems, problems will be encountered as described below when the transmission capacity is increased by raising a bit rate per wavelength or when the transmission capacity is boosted by increasing the number of wavelengths through narrowing of signal wavelength intervals for the merits of high-density wavelength division multiplexing or through exploitation of a new signal wavelength band.

The faster the transmission rate, the broader the spectrum of an optical signal becomes. As a result, an undesirable effect of dispersion and dispersion slopes becomes greater than conventional systems, thereby causing a larger distortion in optical pulses. For this reason, a scheme for dispersion compensation having higher precision than the conventional schemes becomes necessary.

Further, when signal wavelength bands are expanded, a DCF suitable for each transmission path needs to be developed because the dispersion characteristics and the dispersion slope characteristics of optical fibers differ for each signal wavelength band as described above. As an alternative, a plurality of DCFs needs to be combined to provide the dispersion characteristics suitable for the transmission path. Because of such needs, a measure for compensating for dispersion characteristics undesirably becomes complex. When a new signal wavelength band is utilized to increase the number of wavelengths, there is a possibility of accumulated dispersion in this wavelength band becoming large, resulting in a need for an increased number of DCFs. In this case, the conventional configuration as shown in FIG. 1 suffers increasing DCF loss in the DCF 15 arranged between the two stages of the EDFAs 13 and 14 having a two-stage configuration, thereby causing a degradation in the optical signal-to-noise ratio (OSNR). Since there will be stricter requirements for optical receivers as signal speed is increased, an increase in the DCF loss poses a problem when the transmission system having a higher OSNR performance is required. Even in a favorable scenario in which loss at the DCF 16 does not increase, the output power of the EDFA 14 at the first stage needs to be limited in order to suppress a nonlinear effect in the DCF 16, so that an improvement of an OSNR characteristic cannot be expected.

Accordingly, the present invention is aimed at providing an optical-wavelength-division-multiplexing system and a related method that can properly compensate for dispersion while providing high OSNR performance even when a signal-transmission rate is increased or when a signal-transmission bandwidth is expanded, and is also aimed at providing an optical-communication apparatus suitable for implementing such a system.

SUMMARY OF THE INVENTION

It is a general object of the present invention to provide an optical-wavelength-division-multiplexing system, an optical-wavelength-division-multiplexing method, and an optical communication apparatus that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an optical-wavelength-division-multiplexing system, an optical-wavelength-division-multiplexing method, and an optical communication apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an optical communication apparatus which attends to wavelength division multiplexing processing with respect to signals of a plurality of signal transmission bands, the apparatus including a first optical unit which effects distributed Raman amplification and has a characteristic that compensates for dispersion of a transmission path to which the optical communication apparatus is connected, with respect to at least one of the signal transmission bands.

In the optical communication apparatus as described above, dispersion compensation is performed together with distributed Raman amplification, so that proper dispersion compensation can be attained and high OSNR performance can be achieved even when a signal transmission rate is increased or when signal transmission bandwidths are expanded.

DESCRIPTION OF THE PREFERRED EMBODIMENTS

In the following, embodiments of the present invention will be described with reference to the accompanying drawings.

The present invention provides a method of compensating for dispersion that changes the position of DCF from a conventional arrangement where it is situated between the two stages of EDFAs having a two-stage configuration, and that can properly function even when a signal-transmission rate is increased or when a signal-transmission bandwidth is expanded, and also provides an optical-wavelength-division-multiplexing system having higher OSNR performance and an optical-communication apparatus suitable for implementing such a system.

To this end, an embodiment of the present invention connects a DCF to one end of a transmission-line fiber. Further, this embodiment provides an additional DCF at outputs of a demultiplexer that demultiplexes a signal into each signal wavelength band so as to compensate for residual dispersion on a signal-wavelength-band-specific basis when the residual dispersion remains after compensation by the former DCF, and provides a dispersion compensation device (DCF or variable dispersion compensator) at outputs of a demultiplexer that demultiplexes a signal into each signal wavelength so as to compensate for residual dispersion on a signal-wavelength-specific basis, thereby achieving high-precision dispersion compensation.

Moreover, the embodiment of the present invention is also directed to an optical wavelength division multiplexing transmission that achieves relaying of an optical signal with little OSNR degradation by inputting higher-power optical signal into each optical-fiber amplifier. Such an optical wavelength division multiplexing transmission includes a distributed Raman amplification function that uses, as an amplification medium, a DCF linked to a transmission line, or a DCF linked to the output of the demultiplexer that demultiplexes a signal into each signal wavelength band, thereby compensating for DCF loss.

Figure 4:
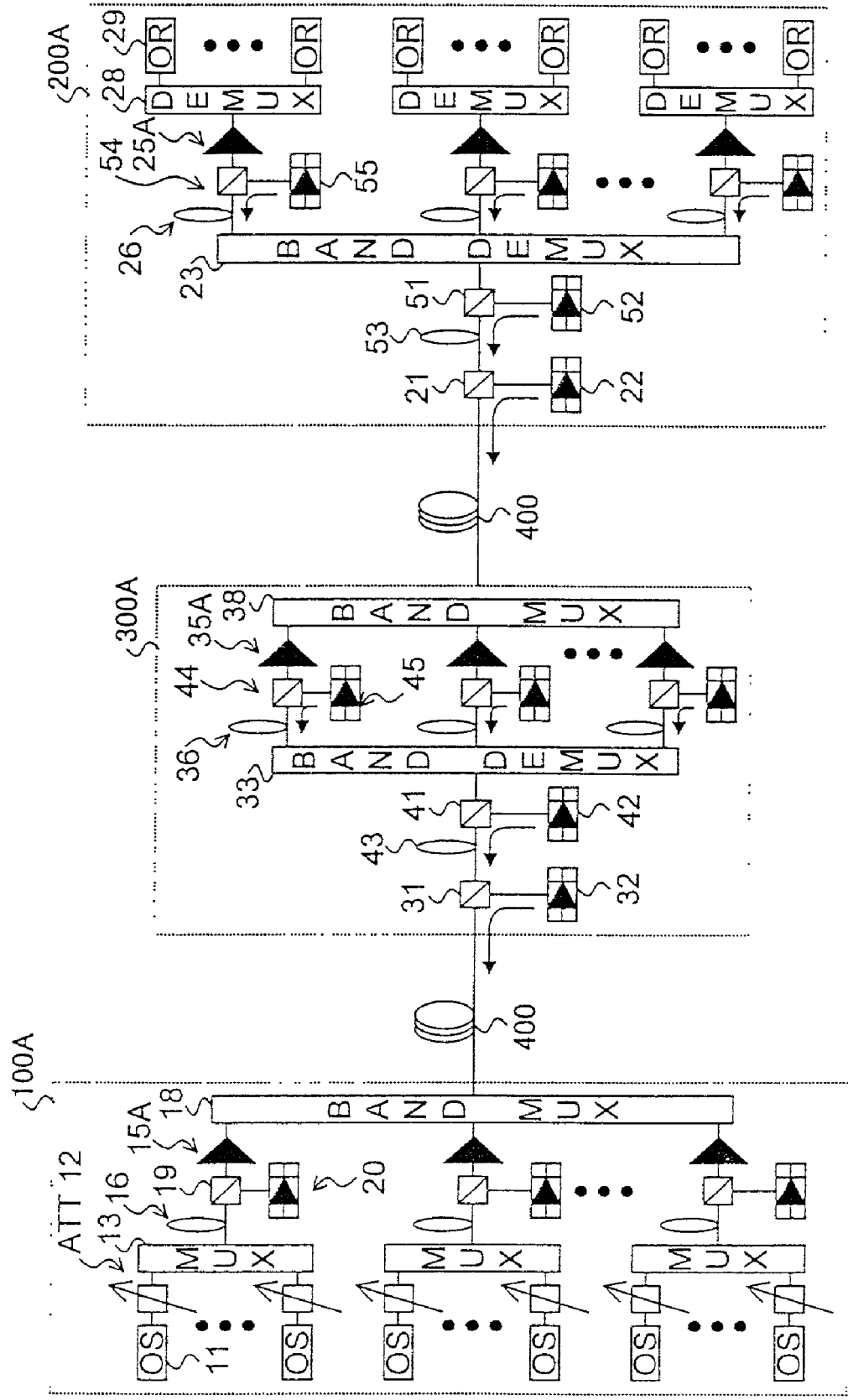
FIG. 4 is a drawing showing a first embodiment of the present invention.

FIG. 4 shows a first embodiment of the present invention. The first embodiment of the present invention includes an optical-wavelength-division-multiplexing transmission system and a related method that assume use of DRA having a transmission-line fiber and a dispersion compensation DCF as an amplification medium, and includes optical communication apparatuses such as an optical transmission apparatus, an optical receiving apparatus, an optical relaying apparatus, and the like used in such a system.

Figure 1:
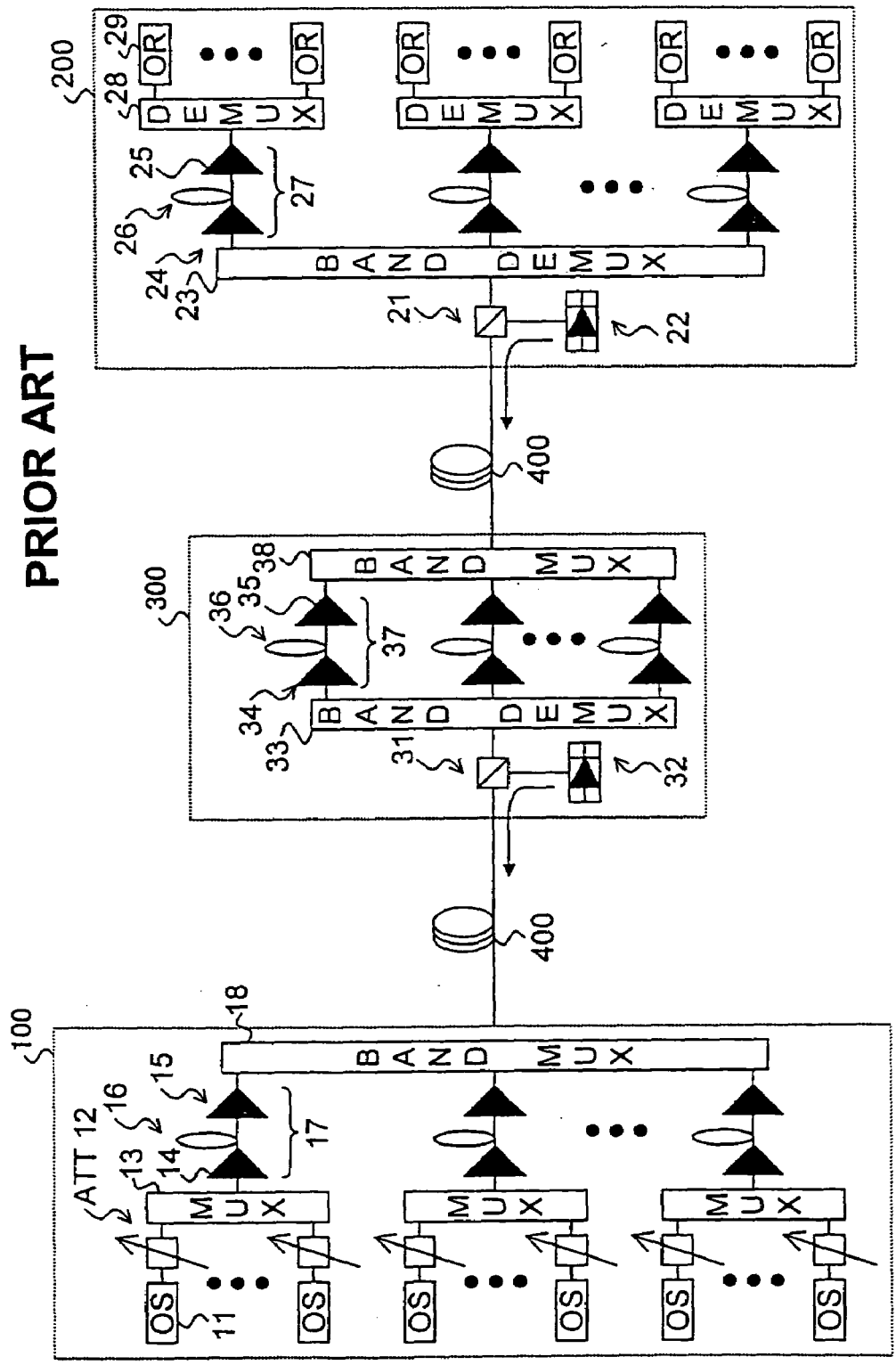
FIG. 1 is a drawing showing an example of a conventional WDM transmission system.
Figure 2:
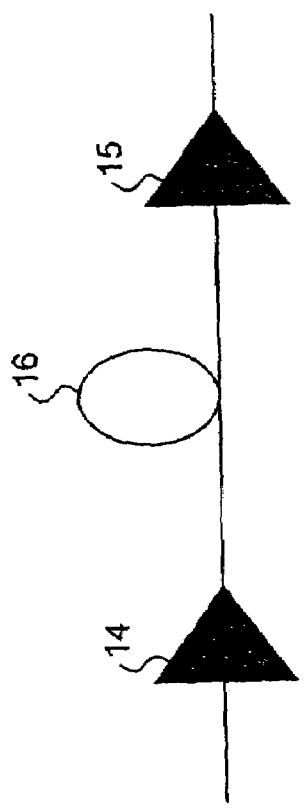
FIG. 2 is a drawing showing an example of a configuration of a conventional optical amplifier.
Figure 2:
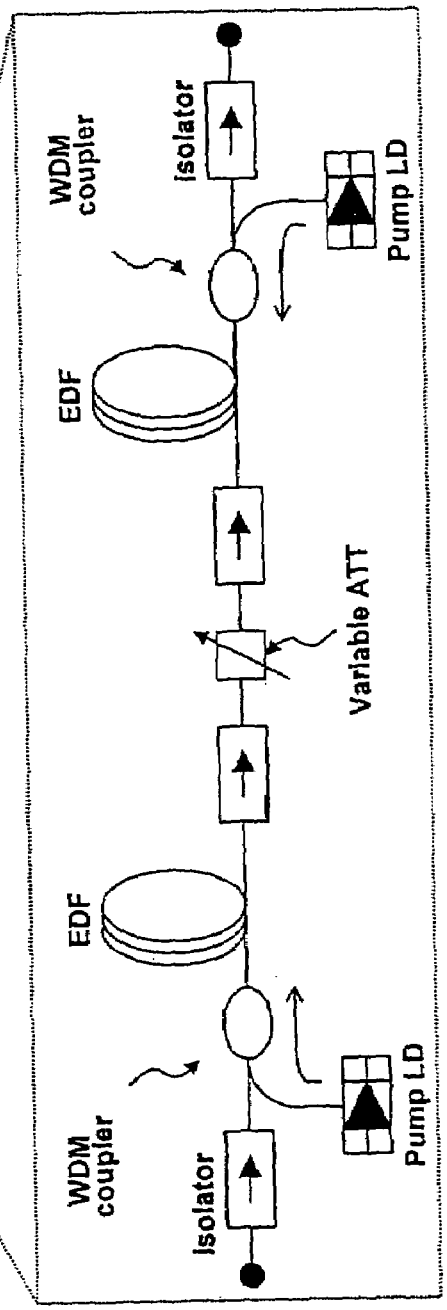
Figure 3:
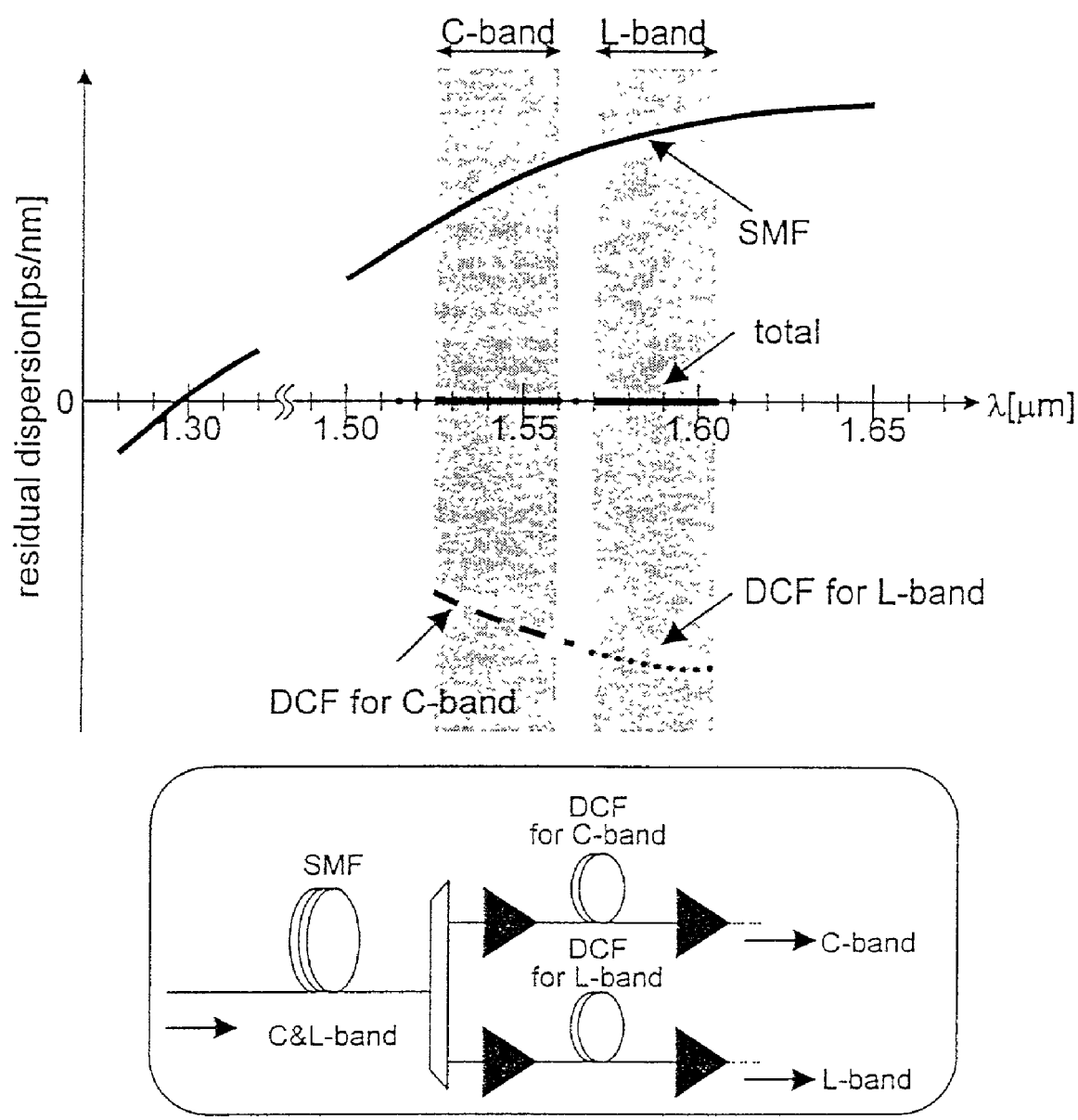
FIG. 3 is a schematic diagram for explaining a method of compensating for dispersion.

In FIG. 4, the same elements as those of previously described FIG. 1 through FIG. 3 are referred to by the same numerals.

The system shown in FIG. 4 includes an optical transmitting apparatus 100A, an optical receiving apparatus 200A, an optical relaying apparatus 300A, and transmission-line fibers 400. In an actual system, a plurality of optical relaying apparatuses 300A is provided. The optical transmitting apparatus 100A differs from the conventional optical transmitting apparatus 100. The optical transmitting apparatus 100A is not provided with the EDFA 14, but includes a pump light source 20 for DRA using DCF as an amplification medium and an optical coupler 19 newly provided for each signal wavelength band as illustrated in the figure. The DCF 16, the optical coupler 19, and the pump light source 20 together constitute a first optical unit. The first optical unit has such property as to compensate for dispersion (accumulated dispersion) of the transmission lines 400, and performs distributed Raman amplification. Moreover, EDFA 15A has a configuration different from that of EDFA 15 as will be described later.

The optical receiving apparatus 200A differs from the conventional optical receiving apparatus 200. The optical receiving apparatus 200A is not provided with the EDFA 24, but includes a pump light source 55 for DRA using DCF as an amplification medium and an optical coupler 54 newly provided for each signal wavelength band as shown in the figure. Further, an optical coupler 51, a pump light source 52, and a DCF 53 are provided for the transmission-line fiber 400 as illustrated in FIG. 4. The DCF 26, the optical coupler 54, and the pump light source 55 together make up a first optical unit. Moreover, a second optical unit is defined as including the DCF 53, the optical coupler 51, and the pump light source 52. The second optical unit has the chromatic dispersion and dispersion slope characteristics of reverse singes relative to those of the transmission line 400, and performs distributed Raman amplification. Further, the first optical unit compensates for residual dispersion of the transmission line 400 that was not compensated for by the second optical unit. The EDFA 25A has a configuration different from that of the EDFA 25.

The optical relaying apparatus 300A differs from the conventional optical relaying apparatus 300 as it does not have the EDFA 34. The optical relaying apparatus 300A is provided with a pump light source 45 and an optical coupler 44 for each signal wavelength band as illustrated, and is further provided an optical coupler 41, a pump light source 42, and a DCF 43 with respect to the transmission-line fiber 400 as shown in FIG. 4. A first optical unit is defined as having a DCF 36, an optical coupler 44, and a pump light source 45. A second optical unit is further defined as having a DCF 43, an optical coupler 41, and a pump light source 42. The second optical unit has the chromatic dispersion and dispersion slope characteristics of reverse signs relative to those of the transmission line 400, and performs distributed Raman amplification. Further, the first optical unit compensates for residual dispersion of the transmission line 400 that was not compensated for by the second optical unit. The EDFA 35A has a configuration different from that of the EDFA 35.

Light of various wavelengths output from the optical transmitters 11 is input via the optical variable attenuators 12 for adjusting the input power of optical signals to the multiplexers (MUX) 13, which multiplex the light of various wavelengths to output WDM optical signals. Light of various wavelengths is multiplexed separately for each signal wavelength band (for example, C-band, L-band, S-band, and so on). The WDM light signal of various signal wavelength bands output from the respective multiplexers 13 is input to and has dispersion thereof compensated for by the respective DCFs 16, which have dispersion characteristics of reverse signs relative to the transmission-line fiber 400. The optical coupler 19 is connected to the output end of the DCF 16. Pump light for the purpose of distributed Raman amplification (DRA) that amplifies a signal by using the DCF 16 as an amplification medium is supplied from the pump light source (pump LD) 20 to the DCF 16 via the optical coupler 19.

The wavelength of the pump light output from the pump light source 20 is set to such a wavelength as Raman gains are obtained in each signal band. Accordingly, the WDM light signal input to the DCF 16 propagates through the fiber while being amplified by DRA. The WDM light signal of each signal wavelength band output from the optical coupler 19 connected to the output end of the DCF 16 is amplified by an erbium doped fiber amplifier (EDFA) 15A, which employs an erbium doped fiber.

Figure 5:
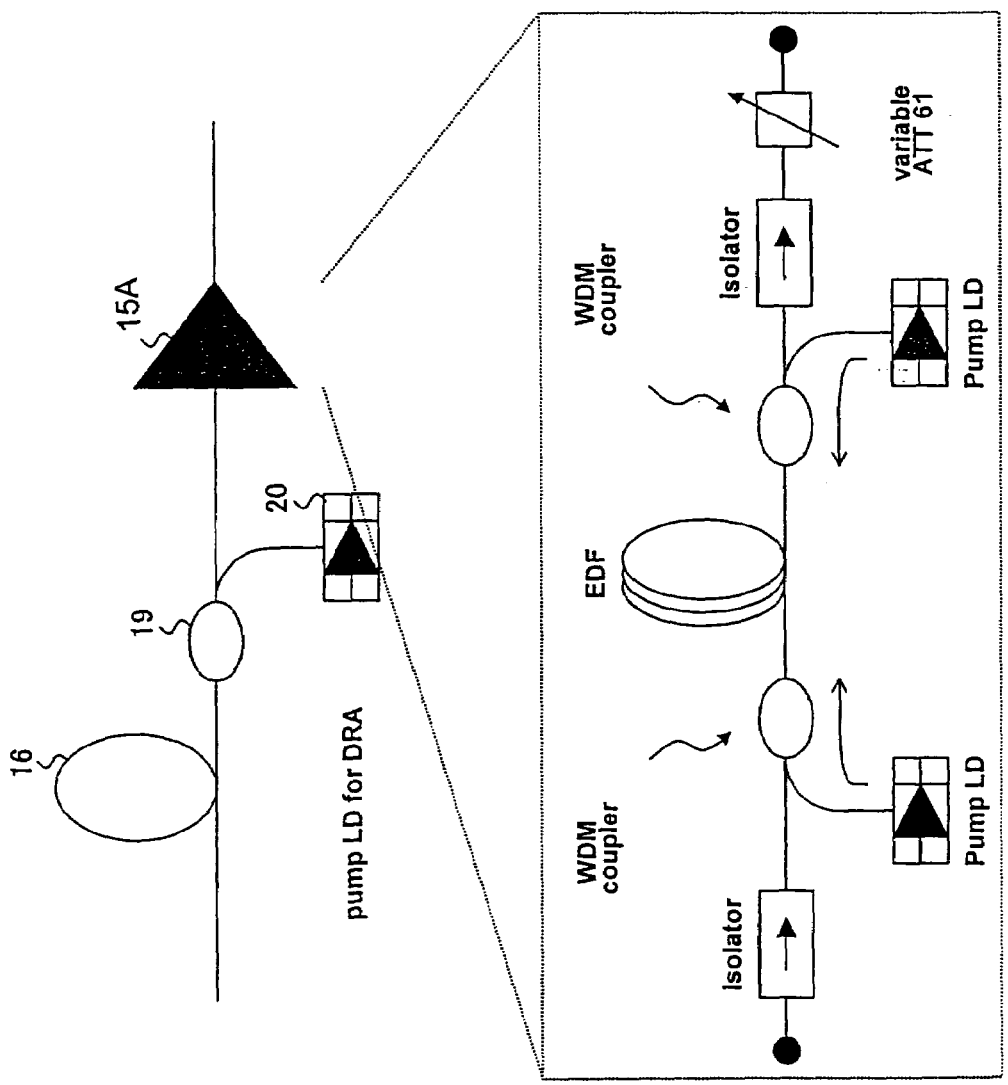
FIG. 5 is a drawing showing an example of a configuration of an optical amplifier according to the present invention.

FIG. 5 shows an example of a configuration of the optical amplifier 15A according to the present invention. The EDFA 15A shown in FIG. 5 is controlled through AGC (auto gain control) so as to provide a fixed gain. The output end of the EDFA 15A is provided with a variable optical attenuator 61 for output power adjustment. In this manner, the configuration of the EDFA 15A becomes simpler compared with the conventional configuration (see FIG. 2), and the input power to the EDFA 15A can be boosted by compensating for loss through the DCF 16 by use of DRA that uses as an amplification medium the DCF 16 situated at the preceding stage of the EDFA 15A. Accordingly, it is possible to implement an optical amplifier that has a lower noise factor (higher OSNR) characteristic than the conventional configurations. Since the DCF 16 generally has extremely high non-linearity, it also has an advantage in that the Raman gain can be large. The WDM light signal output from each optical amplifier of a corresponding signal wavelength band is multiplexed by the optical coupler (BAND MUX) 18 that multiplexes light of various signal wavelength bands, followed by being supplied to the transmission-line fiber.

The optical coupler 31 formed in the optical relaying apparatus 300A is connected to the output end of the transmission-line fiber 400, and supplies pump light from the pump light source 32 to the transmission-line fiber 400 for the purpose of effecting DRA that uses the transmission-line fiber 400 as an amplification medium. Here, the wavelength of the pump light output from the pump light source 32 is set to such a wavelength as providing a Raman gain in the signal wavelength band. Therefore, the WDM light signal supplied to the transmission-line fiber 400 propagates through the fiber 400 while being amplified by DRA, and is input to the optical relaying apparatus 300A situated at the terminal point of the transmission line.

The WDM light signal input into the optical relaying apparatus 300A is supplied first to the DCF 43, which has the dispersion characteristics and dispersion slope characteristics of reverse signs relative to the transmission-line fiber 400. The optical coupler 41 is connected to the output end of the DCF 43, and supplies DRA-purpose pump light from the pump light source 42 to the DCF 43 where the pump light has such a wavelength as to provide a Raman gain in the signal wavelength band. Therefore, the WDM light signal input to the DCF 43 propagates through the fiber, being amplified by DRA as it propagates. The WDM light signal output from the optical coupler 41 is input to the demultiplexer (BAND DEMUX) 33, which demultiplexes the signal into each signal wavelength band. Light output from a given port of the demultiplexer 33 corresponding to a given signal wavelength band is input to the DCF 36. The DCF 36 has the dispersion characteristics and dispersion slope characteristics that compensate for residual dispersion among all the accumulated dispersion of the transmission-line fiber 400 where the residual dispersion remains after compensation by the DCF 43 provided at the input end of the relaying apparatus. The optical coupler 44 is situated at the output end of the DCF 36 for the purpose of supplying the pump light for DRA output from the pump light source 45. The light that propagates through the DCF 36 can thus obtain gain from DRA. The WDM light signal for each signal wavelength band output from the optical coupler 44 is input into the EDFA 35A, and is amplified thereby. The EDFA 35A has the configuration of FIG. 5. The output light of the EDFA35A corresponding to each signal wavelength band is provided to the transmission-line fiber 400 via the multiplexer (BAND MUX) 38, which multiplexes the WDM light signals of respective signal wavelength bands.

The WDM light signal that has been relayed through successive stages by the optical relaying apparatus 300A (FIG. 4 shows a one-stage configuration) is input to the optical receiving apparatus 200A. In the same manner as in the optical relaying apparatus 300A, the WDM light signal input into the optical receiving apparatus 200A passes through the DCF 53 that has the dispersion characteristics and dispersion slope characteristics of reverse signs relative to the transmission-line fiber 400 and serves as an amplification medium for DRA, the demultiplexer (BAND DEMUX) 23 that demultiplexes the signal into each signal wavelength band, the DCF 26 that has the dispersion characteristics and dispersion slope characteristics that compensate for residual dispersion remaining after compensation by the DCF 53 provided at the input end of the optical receiving apparatus 200A and serves as an amplification medium for DRA, and the EDFA 25A that is provided for each signal wavelength band. After passing through these units, the WDM light signal enters the demultiplexer (DEMUX) 28 that demultiplexes the WDM optical signal of each signal wavelength band into various wavelengths. The light demultiplexed into each wavelength by the demultiplexer 28 is received by a corresponding optical receiver 29. The pump light output from the pump light source 52 is supplied to the DCF 53 through the optical coupler 51. The pump light generated by the pump light source 55 is provided to the DCF 26 via the optical coupler 54.

In the following, a description will be given with regard to the method of compensating for dispersion according to the present invention by taking the optical relaying apparatus 300A as an example.

Figure 6:
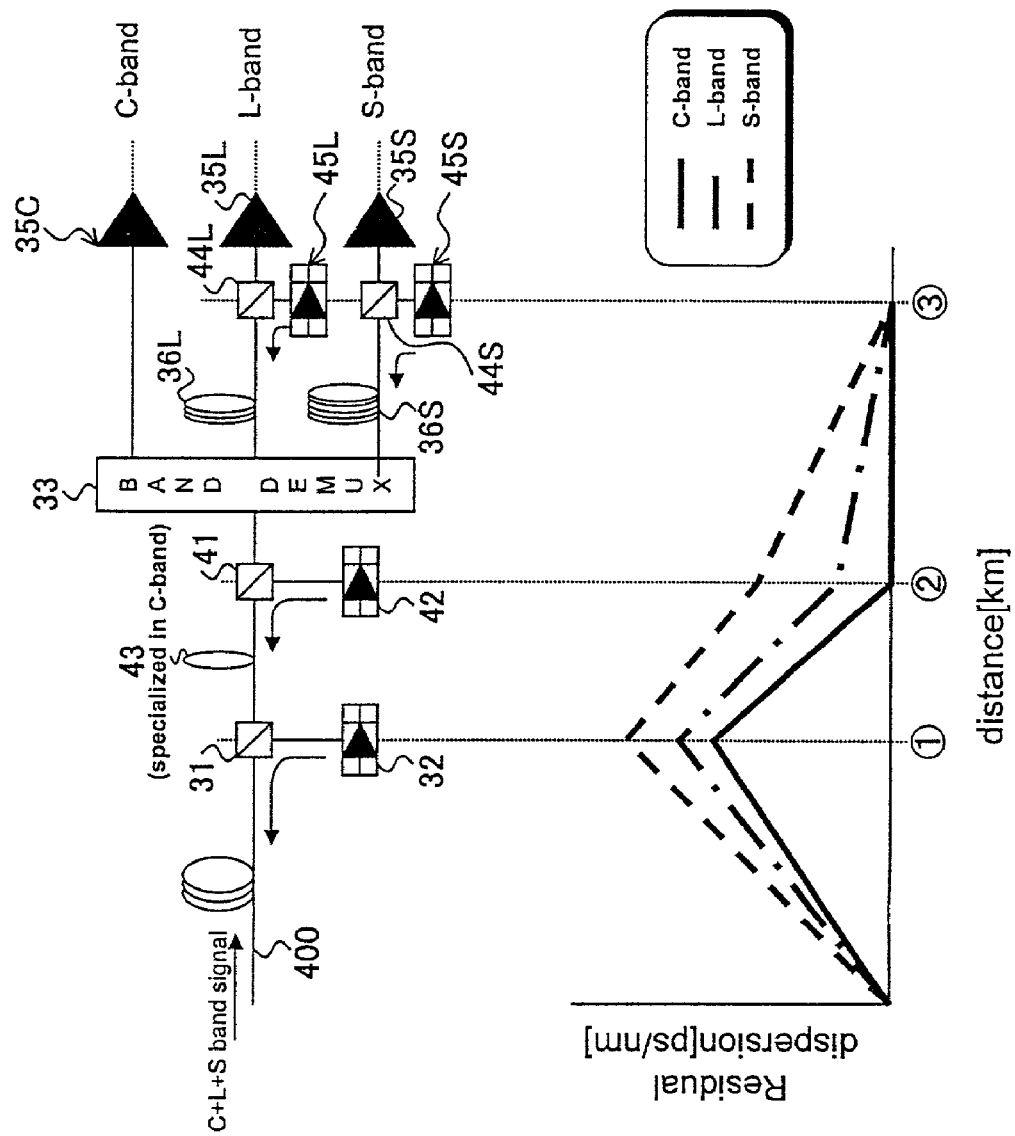
FIG. 6 is a drawing showing an example of accumulated dispersion characteristics in the first embodiment of the present invention in the case of C-band, L-band, and S-band being used.
Figure 7:
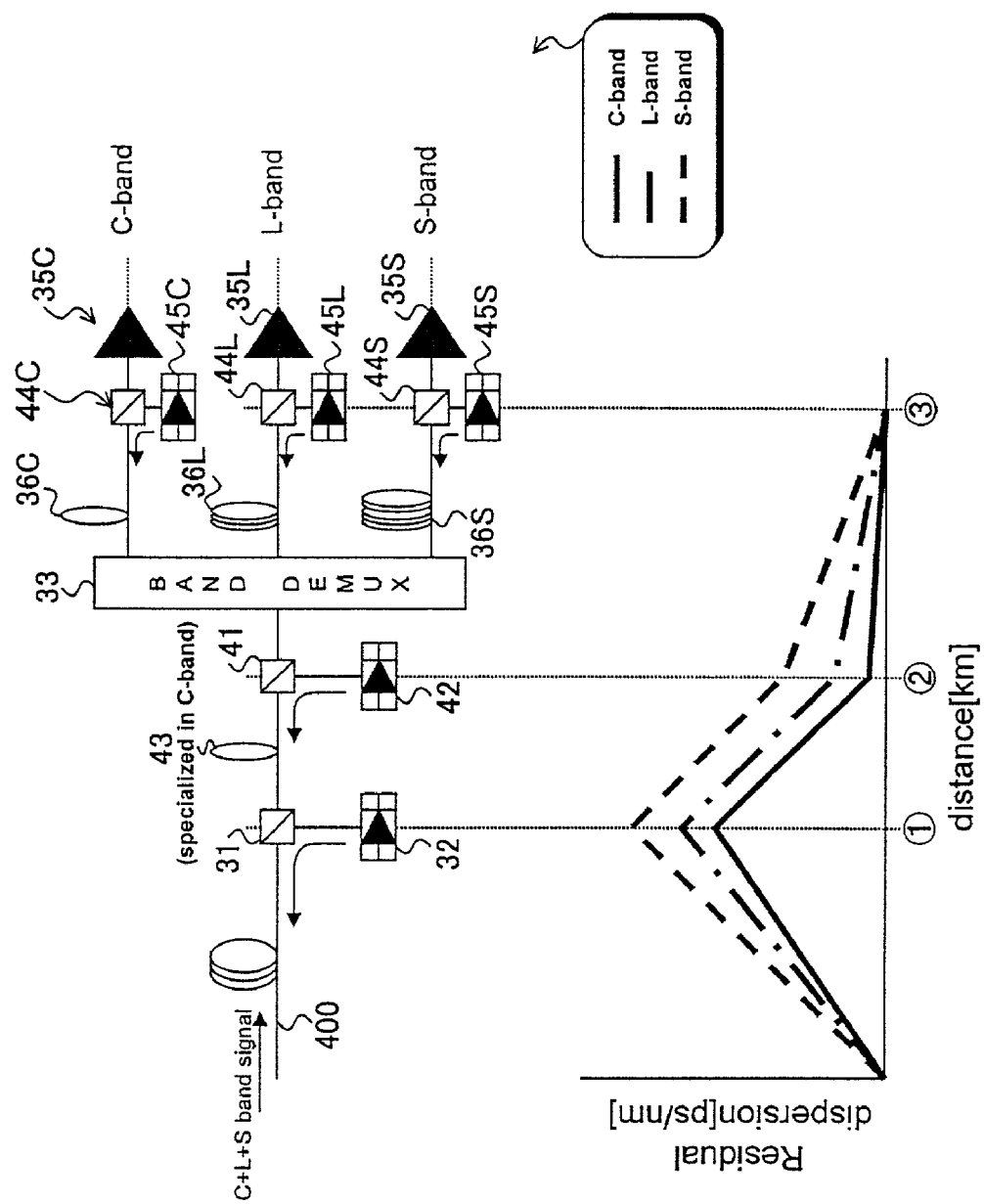
FIG. 7 is a drawing showing an example of accumulated dispersion characteristics in the first embodiment of the present invention in the case of C-band, L-band, and S-band being used.

FIG. 6 and FIG. 7 are drawings showing an example of the accumulated dispersion characteristics in the first embodiment of the present invention in the case of C-band, L-band, and S-band being used. A first dispersion compensation fiber 43 having the dispersion characteristics and dispersion slope characteristics of reverse signs relative to the C-band of the transmission-line fiber 400 is connected to the output of the optical coupler 31, which is arranged at the terminal point of the transmission-line fiber 400 and serves to supply the pump light for DRA. If an ideal dispersion compensation fiber is actually implemented as being capable of fully compensating for accumulated dispersion of the transmission-line fiber 400, the accumulated dispersion of the C-band will be completely compensated for at the output end of the first dispersion compensation fiber 43. (See the C-band characteristic at a distance ② in the graph of accumulated dispersion characteristics versus transmission distance shown in FIG. 6.) In the L-band and the S-band, on the other hand, the first dispersion compensation fiber 43 does not fully compensate for accumulated dispersion, so that some residual dispersion will remain. In order to compensate for the residual dispersion, second dispersion compensation fibers 36L and 36S for residual dispersion compensation are provided at the input stage of EDFAs 35L and 35S after demultiplexing into each signal band. These second dispersion compensation fibers 36L and 36S receive pump light generated by pump light sources 45L and 45S through optical couplers 44L and 44S, respectively. As shown in FIG. 6, it should be noted that the second dispersion compensation fibers are not necessary for the C-band since perfect dispersion compensation is attained by the first dispersion compensation fiber 43 for the C-band.

In reality, however, it is difficult to actually develop a dispersion compensation fiber having ideal dispersion characteristics, and fibers inevitably contain manufacturing variation. Because of this, it is difficult to fully compensate for accumulated dispersion of the transmission-line fiber 400 only by use of the first dispersion compensation fiber 43. Such a case is shown in FIG. 7. In FIG. 7, residual dispersion remains because the DCF 43 connected to the transmission-line fiber 400 cannot fully compensate for dispersion of C-band, L-band, and S-band (at a distance ② in FIG. 7). Accordingly, it is preferable to provide the second DCFs 44C, 44L, and 44S for all the C-band, L-band, and S-band, respectively, at the output of the demultiplexer 33 that demultiplexes the WDM light signal into each signal wavelength band, thereby completely compensating for the accumulated dispersion of the transmission-line fiber 400.

Figure 8:
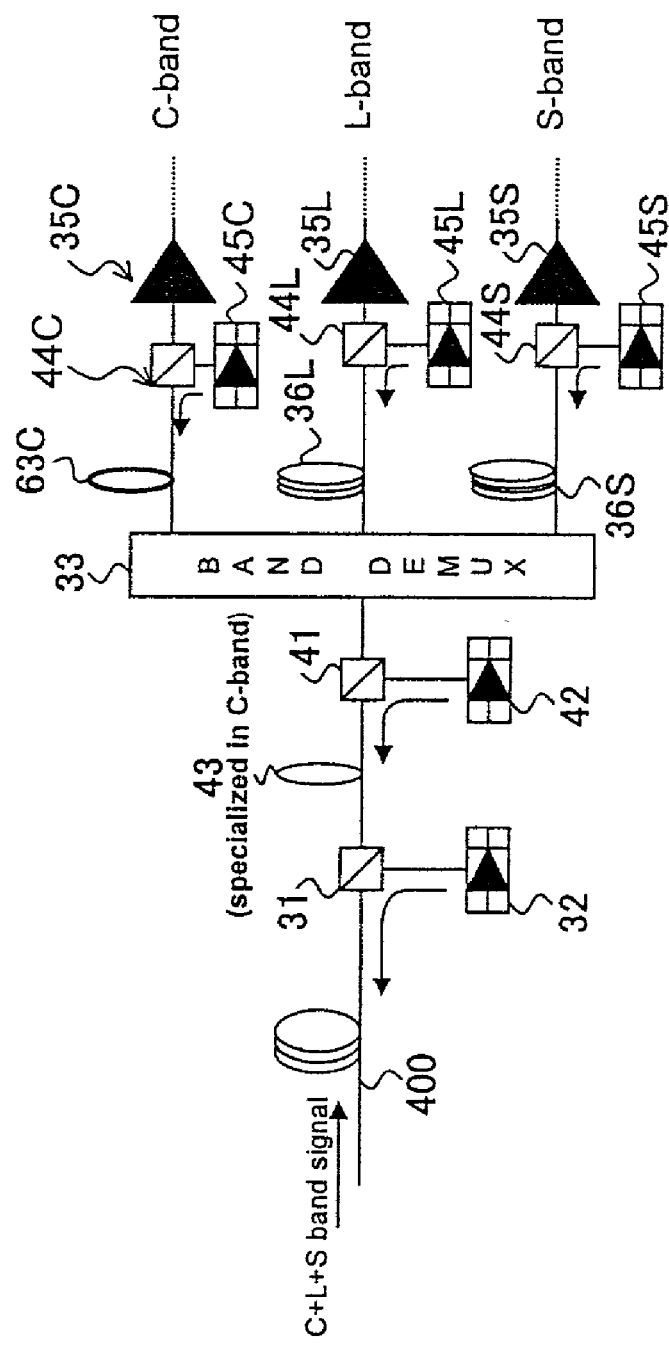
FIG. 8 is a drawing showing an example in which a highly nonlinear fiber having non-linearity factor a few times to some ten times higher than an SMF (single mode fiber) is used for the C-band.

In FIG. 8, an example is shown in which a highly-nonlinear fiber 63C having non-linearity factor a few times to some ten times higher than the SMF (single mode fiber) is used for the C-band in place of the second DCF 36C that was employed in the example of FIG. 6. In the present invention, the DCF serves not only to compensate for chromatic dispersion of a transmission path, but also as an amplification medium for DRA. In the example of FIG. 6, however, there is no signal gain by DRA that would have been achieved by use of the second DCF 36C as shown in FIG. 7. As a result, the input power to the EDFA 35C is lowered, so that a degraded SNR of the EDFA 35C may result in a degradation of the overall system performance. In such a case, a highly nonlinear fiber is used in place of the DCF as an amplification medium for DRA. Since the highly nonlinear optical fiber has a great nonlinearity factor, a proper signal gain can be obtained by DRA even if the length of the fiber is short.

Figure 9:
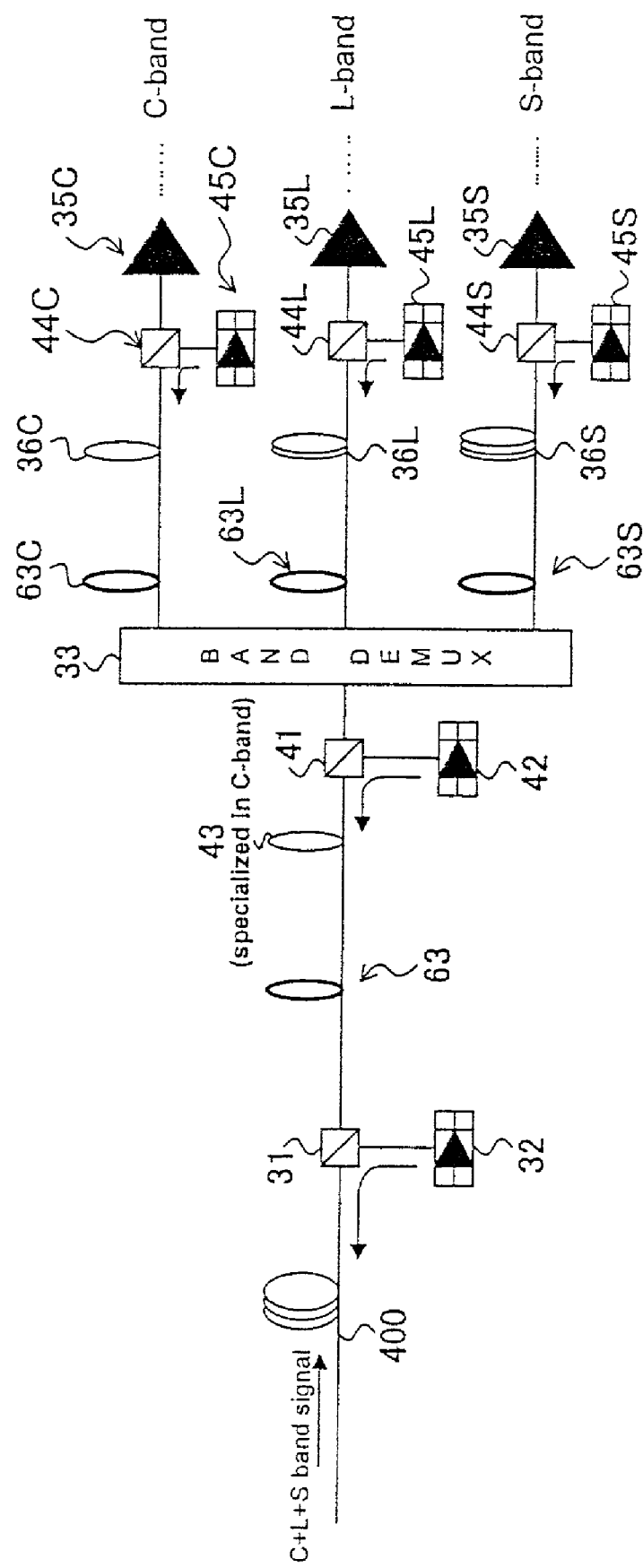
FIG. 9 is a drawing showing a configuration in which highly nonlinear fibers are connected to an end of DCFs.

Accordingly, when there is no need for a DCF for dispersion compensation as shown in the configuration of FIG. 6, the highly nonlinear fiber 63C can be used to produce a signal gain by DRA. Further, if a desired DRA gain cannot be obtained because of too short a length of the second DCFs 36C, 36L, and 36S in the configuration shown in FIG. 7, it is possible to connect highly nonlinear fibers 63C, 63L, and 63S to the end of the DCFs as shown in FIG. 9, thereby obtaining a desired DRA gain.

The same argument applies also in the case of the DCFs 43 and 53 linked to the end of the transmission-line fiber. When a relay distance is short (i.e., when transmission-line fiber length is short), the length of the DCF 43 connected to the end of the transmission-line fiber 400 suffices even if it is short. In this case, however, a desired DRA gain may not be obtained because the length of the DCF is short. In such a case, a highly nonlinear fiber 63 may be connected to the end of the DCF 43 as shown in FIG. 9 in the same manner as employed with respect to the second DCFs 63C, 63L, and 63S, thereby making it possible to provide a desired DRA gain. In other words, even when the length of the transmission path changes, it is possible to control the input power at each point such as to achieve a constant power, thereby properly coping with various transmission-line lengths.

Figure 10:
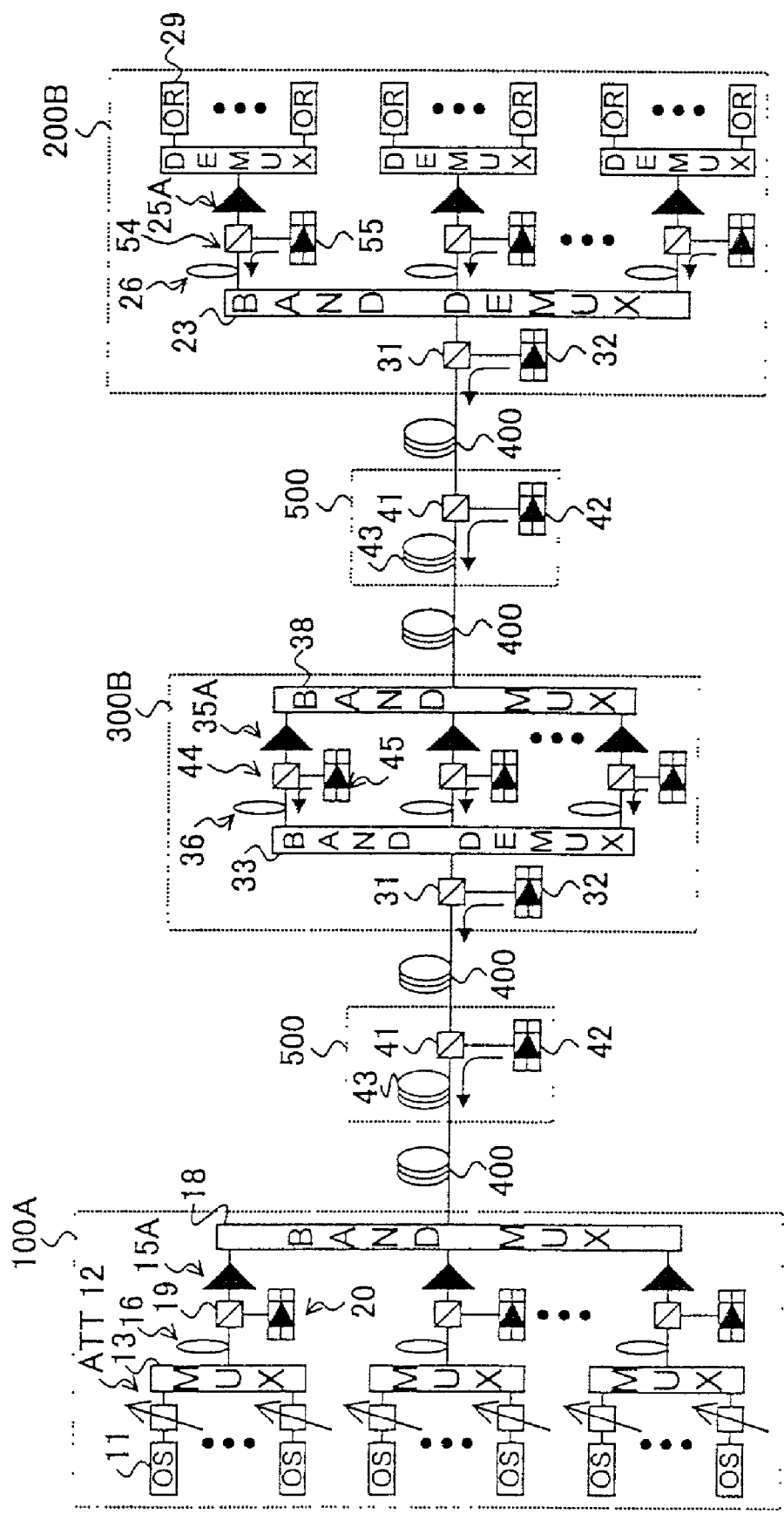
FIG. 10 shows a configuration that is a variation of the first embodiment of FIG. 4 having the transmission-line configuration thereof changed.

FIG. 10 shows a configuration that is a variation of the first embodiment of FIG. 4 having the transmission-line configuration thereof changed. A unit (second optical unit) 500 including the dispersion compensation fiber 43 connected to the output end of the transmission-line fiber 400, the optical coupler 41, and the pump light source 42 as were shown in FIG. 4 is provided halfway along the extension of the transmission-line fiber 400 (halfway between optical-communication apparatuses). As a result, an optical relaying apparatus 300B has a configuration that is obtained by removing the unit 500 from the optical relaying apparatus 300A of FIG. 4. Moreover, the configuration of FIG. 10 includes the optical coupler 31 provided at the output end of a second one of the transmission-line fiber 400 in the series configuration of the transmission-line fiber 400, the dispersion compensation fiber 43, and the transmission-line fiber 400 connected in series, for the purpose of supplying pump light for DRA to the optical fiber. In this configuration, the DRA is provided halfway along the extension of each of the transmission-line fibers 400, so that an average optical level between the optical relaying apparatuses including the EDFA 35A is maintained at a high level. There is thus an advantage in that an OSNR performance is improved compared with the embodiment shown in FIG. 4. Since the optical coupler 41 for supplying pump light for DRA is needed at the output end of the dispersion compensation fiber 43 situated halfway along the extension of a transmission line, however, a span length (relaying distance) substantially becomes half as long.

Figure 11:
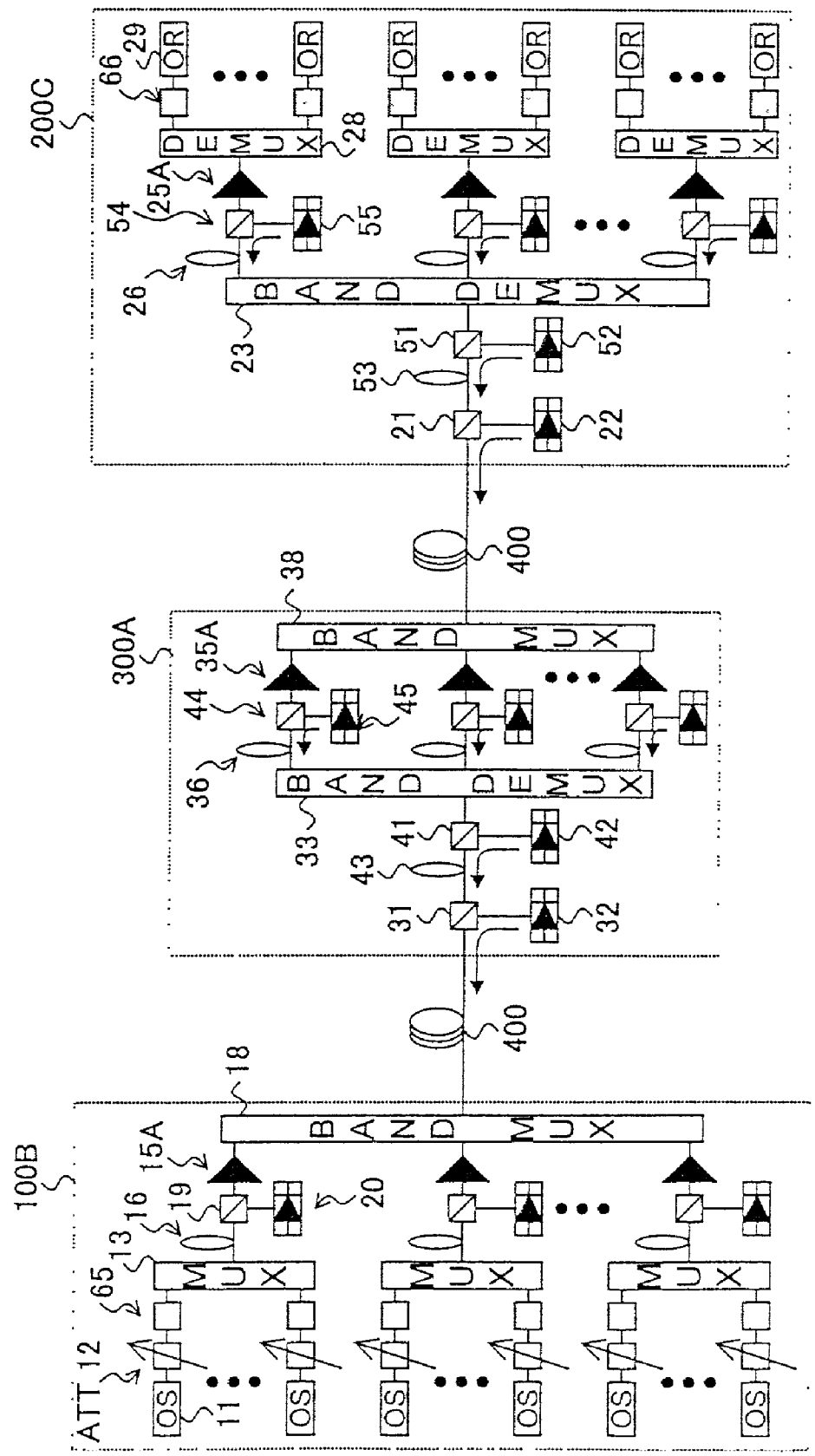
FIG. 11 is a drawing showing a second embodiment of the present invention.

In the following, a second embodiment of the present invention will be described with reference to FIG. 11.

If a bit rate per wavelength is increased to a range of 40 Gb/s for the purpose of boosting system capacity, for example, the dispersion and the dispersion slope of the optical fiber will have an increased effect. In such a case, a highly accurate dispersion compensation technology is necessary. The first embodiment shown in FIG. 4 offers a technology that compensates for accumulated dispersion of the transmission-line fiber 400 for each of signal wavelength bands. It is difficult, however, to achieve a 100% compensation of accumulated dispersion for all the signal wavelength bands because of the manufacture variations of the fibers among other factors. In the second embodiment, therefore, a function to compensate for dispersion on a wavelength-by-wavelength basis is added to the configuration of the first embodiment.

The second embodiment is provided with an optical transmitting apparatus 100B and an optical receiving apparatus 200C having respective configurations that are obtained by adding dispersion compensation devices 65 and 66 to the optical transmitting apparatus 100A and the optical receiving apparatus 200A, respectively, used in the first embodiment. The optical transmitting apparatus 100B is configured such as to have the dispersion compensation devices 65 between the output of the variable optical attenuators 12 and the input of the first multiplexers 13. The optical receiving apparatus 200C is configured such as to have the dispersion compensation devices 66 at the output of the second demultiplexers 28. As the dispersion compensation devices 65 and 66, a dispersion compensation fiber or a variable dispersion compensator (for example, Virtually Imaged Phased Array (VIPA), M. Shirasaki, et al., "VARIABLE DISPERSION COMPENSATOR USING THE VIRTUALLY IMAGED PHASED ARRAY(VIPA) FOR 40-Gbit/s WDM TRANSMISSION SYSTEMS," ECOC2000, Postdeadline Papers Topic 2, 2.3) etc. is used. By use of the dispersion compensation devices 65 and 66 arranged in the optical transmitting apparatus 100B and the optical receiving apparatus 200C, it is possible to achieve a highly precise dispersion compensation that compensates for residual dispersion that remains even after the compensation by the dispersion compensation fibers 16 and 26 situated for each transmission line or for each signal wavelength band. As a result, proper receiving characteristics are achieved by suppressing the undesirable effect of chromatic dispersion of optical fibers even if the bit rate per wavelength becomes as high as 40 Gb/s or the like.

Figure 12:
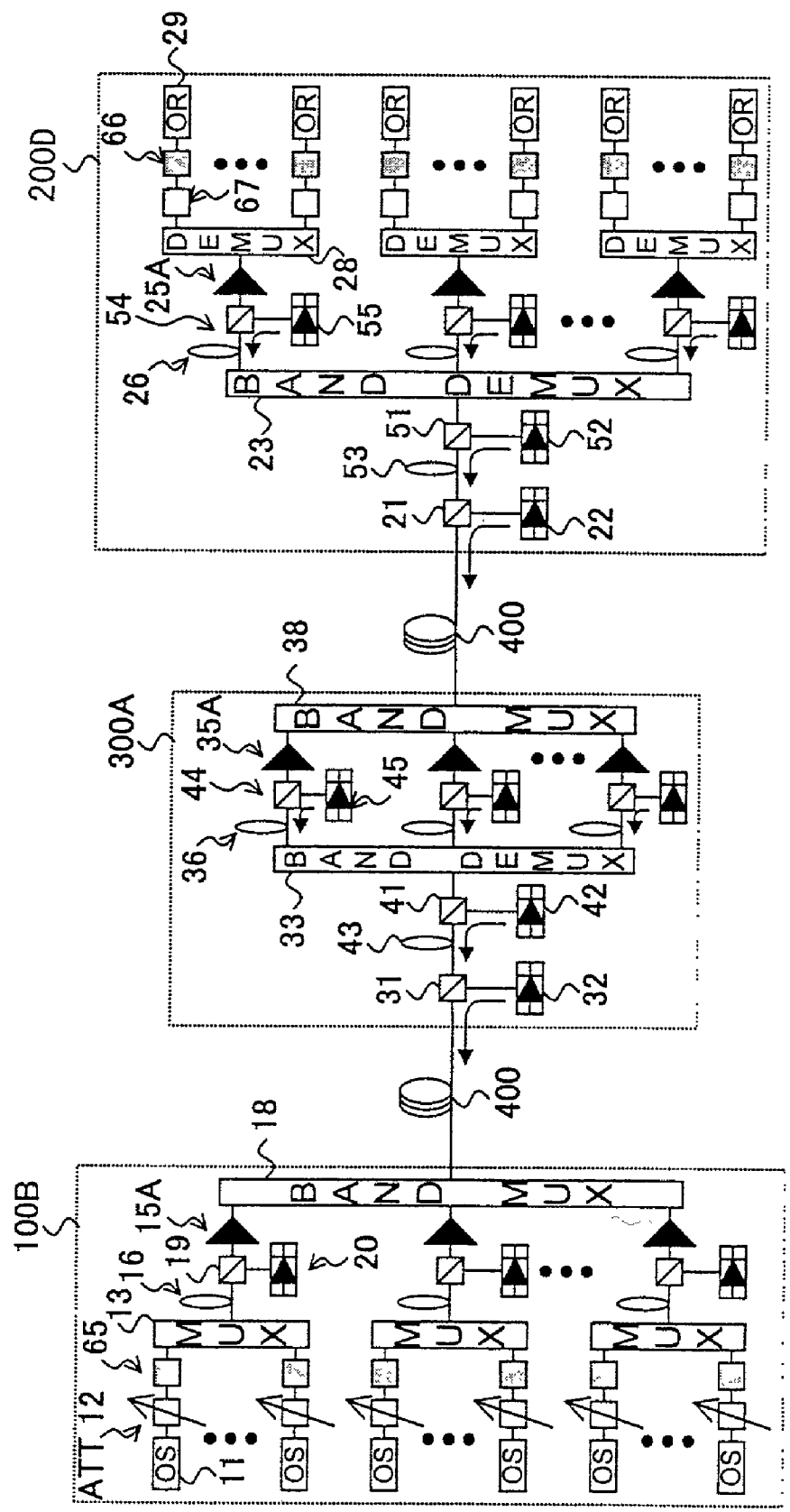
FIG. 12 is a drawing showing a third embodiment of the present invention.

FIG. 12 shows a third embodiment of the present invention. The third embodiment has an optical receiving apparatus 200D in which a polarization-mode dispersion compensator (PMDC) 67 is provided for each wavelength on the receiver side on top of the configuration of the second embodiment. This compensator is provided to take into consideration the fact that an effect of polarization-mode dispersion cannot be disregarded when the bit rate per wavelength is increased to the range of 40 Gb/s. The PMDCs 67 of the third embodiment are arranged between the output of the second demultiplexers 28 and the input of the dispersion compensation devices 66. Since the effect of the PMD can be compensated for at the receiver end by use of the PMDCs 67, proper receiving characteristics are obtained even if the bit rate per wavelength is about 40 Gb/s.

In the following, the pump light source 32 for DRA used in the embodiments described above will be described with reference to FIG. 13. The description provided below is equally applicable to the pump light source 22 for DRA.

Figure 13A:
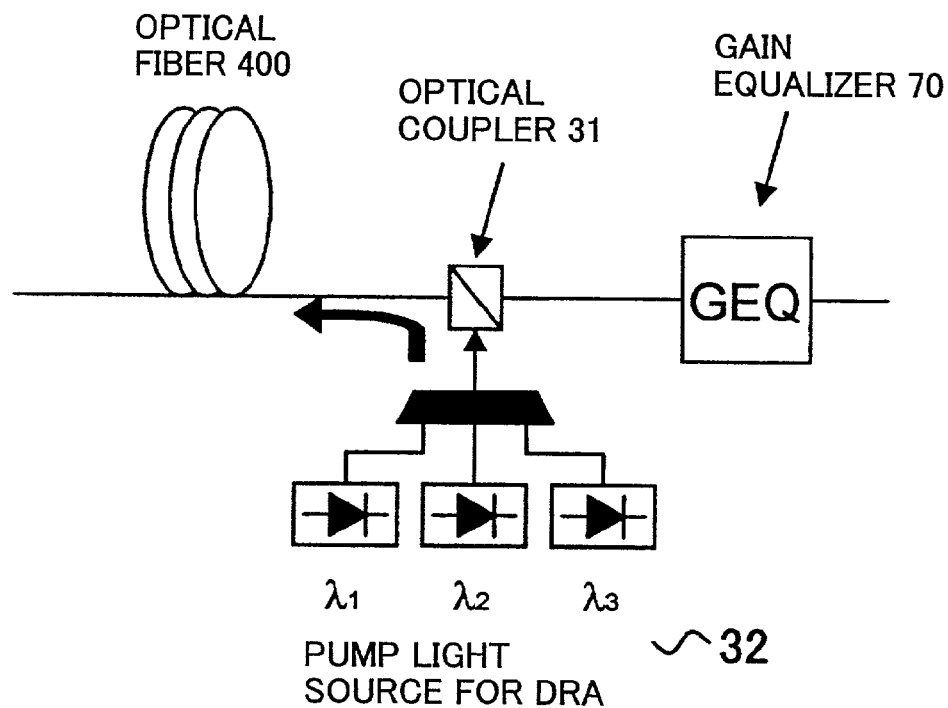
FIGS. 13A and 13B are drawings showing a configuration and a gain characteristic of a distributed Raman optical amplifier (DRA), respectively.
Figure 13B:
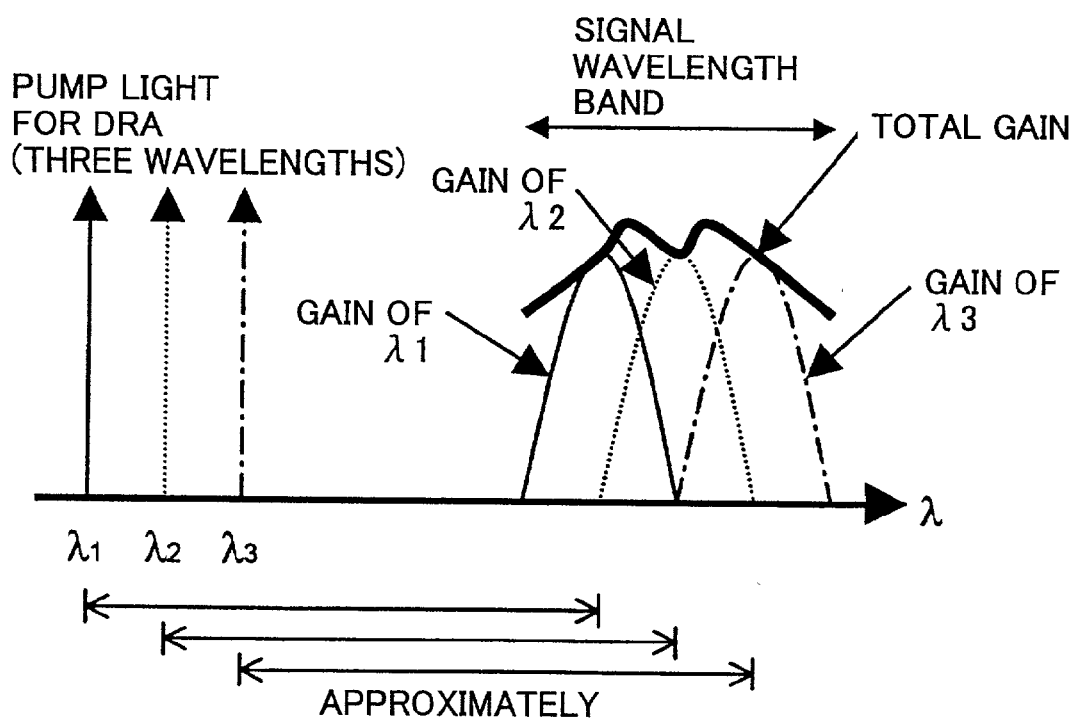

FIGS. 13A and 13B show a configuration and a gain characteristic of a distributed Raman amplifier (DRA), respectively, that utilizes a Raman gain obtained by the stimulus Raman scattering of an optical fiber. FIG. 13A shows a configuration in which light of three different wavelengths $\lambda 1$, $\lambda 2$, and $\lambda 3$ is used for the pump light source 32 for DRA. The optical coupler linked to the end of an optical fiber is connected to the pump light source 32 for DRA, so that pump light is supplied to the optical fiber 400. FIG. 13B shows a drawing for explaining the DRA gain characteristic that is observed. The Raman gain has a characteristic curve having a peak thereof displaced approximately 100 nm from the wavelength of pump light to the side of longer wavelengths. Normally, a plurality of pump light sources (three in FIGS. 13A and 13B) having different wavelengths is provided so as to attain gains across all the signal wavelength bands. When the wavelength intervals of pump light are long as shown in FIG. 13B, however, a surge or a ripple arises in the gain characteristics. The configuration of FIG. 13A, therefore, is provided with a gain equalizer 70 in order to compensate for the wavelength-dependent characteristics of DRA gains.

Figure 14A:
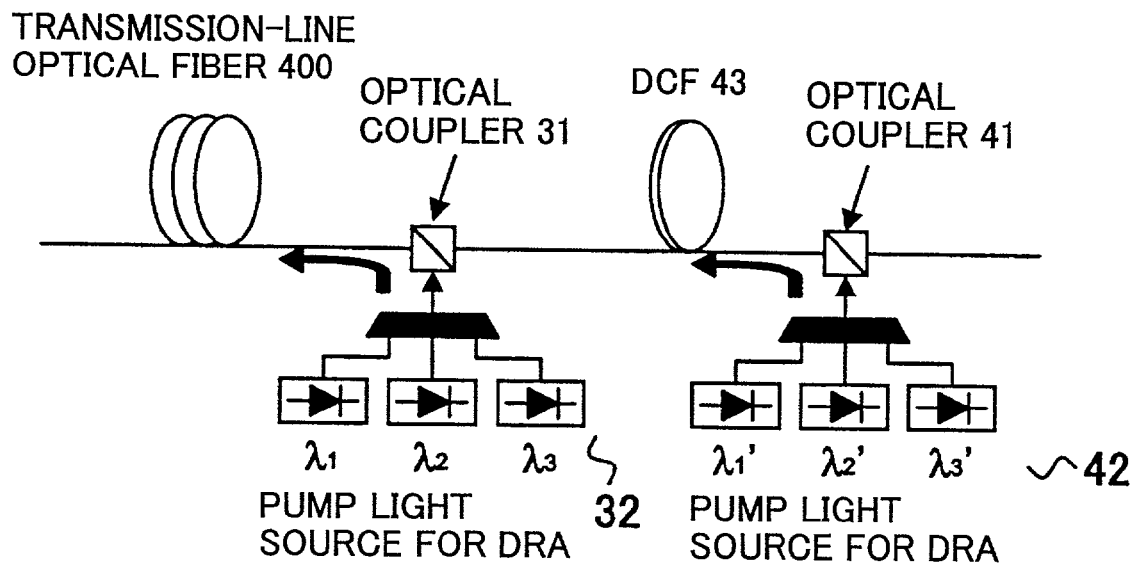
FIGS. 14A through 14D are illustrative drawings showing a configuration of a DRA amplifier and DRA gain characteristics.

In the embodiments of the present invention, as shown in FIG. 14A, the dispersion compensation fiber (DCF) 43, the pump light source 42 for effecting Raman excitation, and the optical coupler 41 are provided with respect to the DRA described above. Here, a description will be given with regard to the two pump light sources 32 and 42. The following description is equally applicable to the pump light sources 22 and 52 for DRA.

Figure 14B:
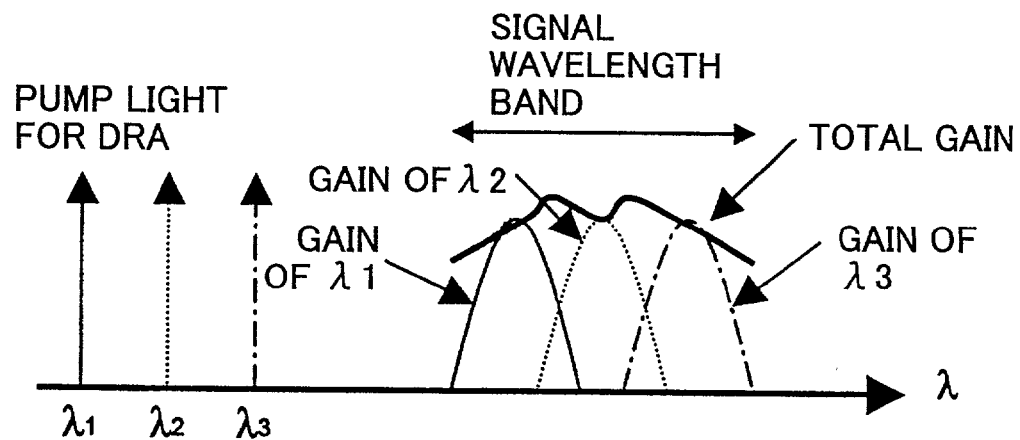
Figure 14C:
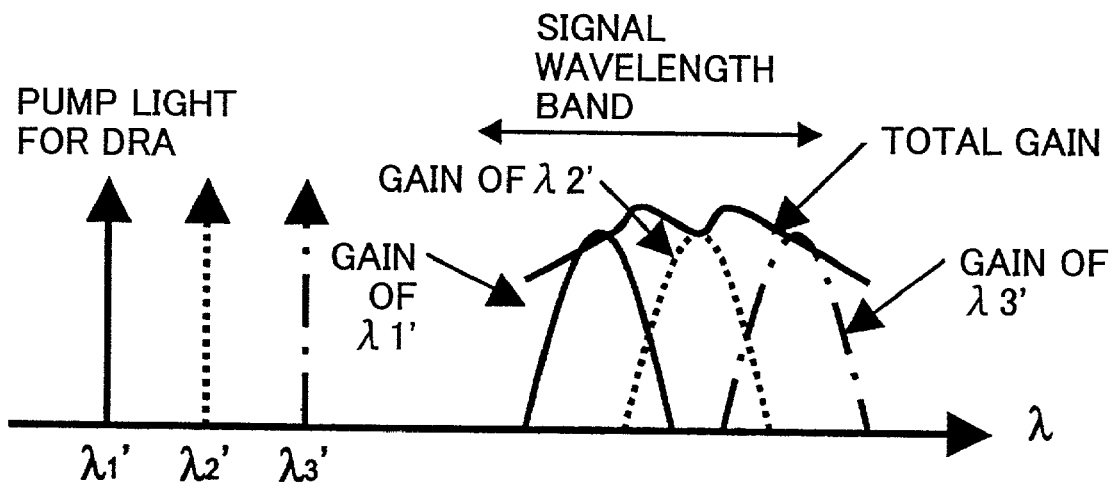
Figure 14D:
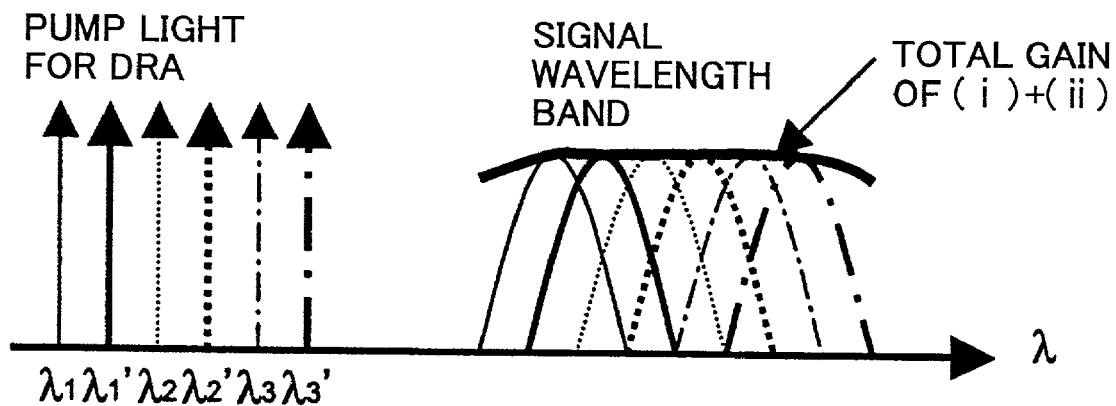

As shown in FIG. 14A, the wavelength-division-multiplexing transmission system according to the present invention has a configuration that effects Raman excitation of the transmission-line fiber 400 and the dispersion compensation fiber 43 linked to the transmission-line fiber 400. In detail, the dispersion compensation fiber 43 that has such characteristics as to compensate for accumulated dispersion of the transmission-line fiber 400 is connected to the transmission-line fiber 400, and the respective outputs are connected the optical couplers 31 and 41 so that the pump light sources 32 and 42 for DRA are coupled to these outputs. Wavelengths $\lambda 1$, $\lambda 2$, and $\lambda 3$ of the pump light supplied to the transmission-line fiber 400 are different from wavelengths $\lambda 1'$, $\lambda 2'$, and $\lambda 3'$ of the pump light supplied to the dispersion compensation fiber FIG. 14B shows a DRA gain characteristic that is observed when Raman excitation of the transmission-line fiber 400 is effected by using $\lambda 1$, $\lambda 2$, and $\lambda 3$ as pump light wavelengths. FIG. 14C shows a DRA gain characteristic that is observed when λ1', λ2', and λ3' different from the above-noted wavelengths are used as pump light wavelengths. As shown in the figures, since wavelengths λ1, λ2, and λ3 of the pump light supplied to the transmission-line fiber 400 are different from the wavelengths λ1', λ2', and λ3' of the pump light supplied to the dispersion compensation fiber 43, the DRA gain characteristics of respective fibers are also displaced along the wavelength axis. When the DRAs having such characteristics are connected in a cascade connection as shown in FIG. 14A, the resulting DRA gain characteristic has a curve with little surges or ripples as shown in FIG. 14D by combining the curves of FIG. 14B and FIG. 14C.

In the wavelength-division-multiplexing transmission system according to the present invention as described above, wavelengths of the DRA pump light sources supplied to the transmission-line fiber and the dispersion compensation fiber are displaced from fiber to fiber, thereby achieving a flat gain characteristic across different wavelengths.

The present invention is not limited to the first through third embodiments. The above embodiments have been provided with reference to use of the C-band, L-band, and S-band as signal wavelength bands. The present invention is intended to include embodiments that use only the C-band and L-band as signal wavelength bands, and to include embodiments that employs a new signal wavelength band such as the L$^+$-band in place of the S-band or on top of the above band selection.

Further, although the optical transmitting apparatuses 100A and 100B have been described as including the optical transmitters 11, the present invention also includes an optical-communication apparatus for which a different configuration having no optical transmitters is defined as an optical transmitting apparatus. By the same token, although the optical receiving apparatuses 200A, 200B, 200C, and 200D have been described as including the optical receivers 29, the present invention also includes an optical-communication apparatus for which a configuration having no optical receivers is defined as an optical receiving apparatus.

Further, the present invention is not limited to these embodiments, but various variations and modifications may be made without departing from the scope of the present invention.

The present application is based on Japanese priority application No. 2001-170206 filed on Jun. 5, 2001, with the Japanese Patent Office, the entire contents of which are hereby incorporated by reference.

What is claimed is:

1. An optical communication apparatus for use with a wavelength division multiplexed (WDM) light signal that includes a plurality of signal transmission band lights multiplexed together and corresponding to a plurality of signal transmission bands, respectively, the apparatus comprising:

a first optical unit receiving a respective signal transmission band light of the plurality of signal transmission band lights as the respective signal transmission band light is separate from the WDM light signal, providing distributed Raman amplification to the received signal transmission band light, and having a characteristic that compensates for dispersion of a transmission path to which said optical communication apparatus is connected, with respect to the signal transmission band corresponding to the received signal transmission band light, to thereby provide Raman amplification and dispersion compensation to the received signal transmission band light as the received signal transmission band light is separate from the WDM light signal; and a second optical unit receiving the WDM light signal, providing distributed Raman amplification to the received WDM light signal, and having a chromatic dispersion characteristic and a dispersion slope characteristic of reverse signs relative to the transmission path with respect to a predetermined signal transmission band of the plurality of signal transmission bands, to thereby provide Raman amplification and dispersion compensation to the WDM signal light, wherein the first optical unit compensates for residual dispersion in the respective signal transmission band light received by the first optical unit that remains after the dispersion compensation provided to the WDM signal light by the second optical unit.

2. The optical communication apparatus as claimed in claim 1, wherein said first optical unit includes a dispersion compensation fiber.

3. The optical communication apparatus as claimed in claim 2, wherein said first optical unit includes a dispersion compensation fiber, an optical coupler, and a pump light source that outputs pump light having a wavelength that brings about a Raman gain through stimulus Raman scattering of the dispersion compensation fiber.

4. The optical communication apparatus as claimed in claim 1, wherein said second optical unit includes a dispersion compensation fiber having a characteristic that compensates for accumulated dispersion of the transmission path completely or to an extend that achieves a predetermined level.

5. The optical communication apparatus as claimed in claim 1, further comprising:

a plurality of said first optical units for the plurality of signal transmission band lights, respectively, other than a signal transmission band light corresponding to the predetermined signal transmission band.

6. The optical communication apparatus as claimed in claim 1, further comprising:

a highly nonlinear optical fiber having a predetermined non-linearity factor and provided for said predetermined signal transmission band, and a plurality of said first optical units for the plurality of signal transmission band lights, respectively, other than a signal transmission band light corresponding to the predetermined signal transmission band.

7. The optical communication apparatus as claimed in claim 1, further comprising:

a plurality of said first optical units for the plurality of the signal transmission band lights, respectively.

8. The optical communication apparatus as claimed in claim 1, wherein a respective first optical unit and a highly nonlinear optical fiber having a predetermined non-linearity factor are provided with respect to each of the signal transmission band lights.

9. The optical communication apparatus as claimed in claim 1, further comprising, for each respective signal transmission band of the plurality of signal transmission bands:

variable optical attenuators that receive optical signals of transmitters, respectively, and attenuate the received optical signals, respectively;

variable dispersion compensators that compensate for accumulated dispersion in the attenuated optical signals, to thereby output compensated optical signals; and a first multiplexer that multiplexes the compensated optical signals, to thereby form the signal transmission band light corresponding to the respective signal transmission band.

10. The optical communication apparatus as claimed in claim 9, further comprising:
a plurality of said first optical units corresponding, respectively, to the plurality of signal transmission band lights, respectively, wherein each first optical unit provides Raman amplification and dispersion compensation to the corresponding signal transmission band light, respectively,
a second multiplexer that receives each signal transmission band light after being Raman amplified and dispersion compensated by the corresponding first optical unit, and that multiplexes the received signal transmission band lights to thereby form the WDM light signal, wherein the WDM light signal formed by the second multiplexer is provided to the second optical.

11. The optical communication apparatus as claimed in claim 1, further comprising:
a first demultiplexer that demultiplexes the WDM light signal, after being Raman amplified and dispersion compensated by the second optical unit, into the plurality of signal transmission band lights; and
a plurality of second demultiplexers corresponding, respectively, to the plurality of signal band transmission lights, each second demultiplexer demultiplexing the corresponding signal transmission band light into signals of respective signal wavelengths.

12. The optical communication apparatus as claimed in claim 11, further comprising:
a plurality of said first optical units corresponding, respectively, to the plurality of signal transmission band lights, respectively, wherein each first optical unit provides Raman amplification and dispersion compensation to the corresponding signal transmission band light, respectively,
wherein the plurality of first optical units are positioned between the first demultiplexer and the second demultiplexers so that each second demultiplexer demultiplexes the corresponding signal transmission band light after the signal transmission band light is Raman amplified and dispersion compensated by the corresponding first optical unit.

13. The optical communication apparatus as claimed in claim 11, further comprising variable dispersion compensators for compensating for accumulated dispersion of the signals of respective signal wavelengths output from said second demultiplexers.

14. The optical communication apparatus as claimed in claim 13, further comprising polarization-mode dispersion compensators for compensating for polarization mode dispersion of the signals of respective signal wavelengths output from said second demultiplexers.

15. The optical communication apparatus as claimed in claim 1, wherein said first optical unit includes a dispersion compensation fiber that functions as a distributed Raman amplification medium, wherein pump light supplied to the said dispersion compensation fiber has a wavelength different from that of pump light supplied to an optical fiber of said transmission path.

16. The optical communication apparatus as claimed in claim 1, further comprising with respect to each of signal transmission bands:
an optical fiber amplifier which includes a rare earth doped fiber and has a gain that is controlled to a constant level; and
a variable optical attenuator which is provided at an output of said optical fiber amplifier.

17. The optical communication apparatus as claimed in claim 1, wherein the first optical unit is inside an optical transmitting apparatus that receives outputs of optical transmitters, and outputs the WDM light signals to the transmission path.

18. The optical communication apparatus as claimed in claim 1, wherein said first optical unit is inside an optical receiving apparatus that receives the WDM signal light from the transmission path.

19. The optical communication apparatus as claimed in claim 1, wherein said first optical unit is inside a relaying apparatus that receives the WDM signal light.

20. An optical communication system, comprising:
an optical transmission path; and
an optical communication apparatus which is connected to said transmission path, and includes a first optical unit that effects distributed Raman amplification and has a characteristic that compensates for dispersion of said transmission path, with respect to at least one signal transmission band of a plurality of signal transmission bands included in light traveling through the transmission path, wherein
said transmission path is provided with a second optical unit that effects distributed Raman amplification, and has a chromatic dispersion characteristic and a dispersion slope characteristic of reverse signs relative to said transmission path to thereby provide dispersion compensation by the second optical unit, and
the dispersion compensated for by said first optical unit is residual dispersion of said transmission path that remains after the compensation provided by the second optical unit.

21. The optical communication apparatus as claimed in claim 20, wherein said second optical unit is provided at an end of said transmission path.

22. The optical communication apparatus as claimed in claim 20, wherein said second optical unit is provided halfway along said transmission path.

23. An apparatus comprising:
an optical transmitting device comprising
a first dispersion compensation fiber compensating dispersion of a first wavelength division multiplexed light traveling through the first dispersion compensation fiber, and provided with Raman pump light so that Raman amplification of the first wavelength division multiplexed light occurs in the first dispersion compensation fiber as the first wavelength division multiplexed light travels through the first dispersion compensation fiber, and
a multiplexer multiplexing the first wavelength division multiplexed light with a second wavelength division multiplexed light, to thereby produce a third wavelength division multiplexed light which is output from the optical transmitting device and thereafter travels through an optical transmission path; and
a second dispersion compensation fiber positioned along the optical transmission path and provided with Raman pump light so that Raman amplification of the third wavelength division multiplexed light occurs in the second dispersion compensation fiber as the third wavelength division multiplexed light travels through the second dispersion compensation fiber, wherein the second dispersion compensation fiber has a chromatic dispersion characteristic and a dispersion slope characteristic of reverse signs relative to the optical transmission path to thereby provide dispersion compensation, and the first dispersion compensation fiber compensates for residual dispersion of the optical transmission path that remains after the compensation provided by the second dispersion compensation fiber.

24. An apparatus as in claim 23, wherein the second dispersion compensation fiber is positioned inside an optical receiving apparatus.

25. An apparatus as in claim 23, wherein the second dispersion compensation fiber is positioned inside an optical relaying apparatus.

26. An apparatus as in claim 23, wherein the optical transmitting device is positioned inside an optical transmitting apparatus.

27. An apparatus as in claim 23, wherein the optical transmitting device is positioned inside an optical relaying apparatus.

28. An apparatus as in claim 23, wherein
the optical transmitting device is positioned inside an optical relaying apparatus, and
the second dispersion compensation fiber is positioned inside an optical receiving apparatus.

29. An apparatus as in claim 23, wherein
the optical transmitting device is positioned inside an optical transmitting apparatus, and
the second dispersion compensation fiber is positioned inside an optical receiving apparatus.

30. An apparatus comprising:
a first dispersion compensation fiber compensating dispersion of a first wavelength division multiplexed light traveling through the first dispersion compensation fiber, and provided with Raman pump light so that Raman amplification of the first wavelength division multiplexed light occurs in the first dispersion compensation fiber as the first wavelength division multiplexed light travels through the first dispersion compensation fiber;
a multiplexer multiplexing the first wavelength division multiplexed light with a second wavelength division multiplexed light, to thereby produce a third wavelength division multiplexed light which travels through an optical transmission path;
a second dispersion compensation fiber positioned after an output of the optical transmission path and provided with Raman pump light so that Raman amplification of wavelength division multiplexed light output from the optical transmission path occurs in the second dispersion compensation fiber as the outputted wavelength division multiplexed light travels through the second dispersion compensation fiber, wherein
the dispersion compensated by the first dispersion compensation fiber is for dispersion of the optical transmission path,
the second dispersion compensation fiber has a chromatic dispersion characteristic and a dispersion slope characteristic of reverse signs relative to the optical transmission path to thereby provide dispersion compensation, and
the first dispersion compensation fiber compensates for residual dispersion that remains after the compensation provided by the second dispersion compensation fiber.

31. An apparatus comprising:
a dispersion compensation fiber positioned along an optical transmission path and provided with Raman pump light so that Raman amplification of a wavelength division multiplexed (WDM) light occurs in the dispersion compensation fiber as the WDM light travels through the dispersion compensation fiber; and
an optical relaying or receiving apparatus which receives the Raman amplified WDM light, and comprises:
a demultiplexer demultiplexing the received WDM light into a plurality of different signal band lights corresponding, respectively, to a plurality of different signal transmission bands, and
a plurality of dispersion compensation fibers compensating dispersion of the plurality of signal band lights, respectively, wherein each dispersion compensation fiber is provided with Raman pump light so that Raman amplification of the corresponding signal band light occurs in the dispersion compensation fiber as the signal band light travels through the dispersion compensation fiber, wherein
the dispersion compensation fiber positioned along the transmission path has a chromatic dispersion characteristic and a dispersion slope characteristic of reverse signs relative to the transmission path to thereby provide dispersion compensation, and
each of the plurally of dispersion compensation fibers of said optical relaying or receiving apparatus compensates for residual dispersion of the optical transmission path In the corresponding signal band light which remains after the compensation provided by the dispersion compensation fiber positioned along the transmission path.

* * * * *

UNITED STATES PATENT AND TRADEMARK OFFICE
CERTIFICATE OF CORRECTION

PATENT NO. : 7,200,333 B2
APPLICATION NO. : 09/962164
DATED : April 3, 2007
INVENTOR(S) : Toru Katagiri et al.

It is certified that error appears in the above-identified patent and that said Letters Patent is hereby corrected as shown below:

On the title page, item [56]: Column 2 (Other Publications), Line 1, change "Roman" to --Raman--.

On the title page, item [56]: Column 2 (Other Publications), Line 2, change "pumpted" to --pumped--.

On the title page, item [56]: Column 2 (Other Publications), Line 2, change "diodes".," to --diodes,"--.

On the title page, item [56]: Column 2 (Other Publications), Line 5, change "Roman" to --Raman--.

Column 14, Line 48, change "claim 1,further" to --claim 1, further--.

Column 15, Line 19, change "optical." to --optical unit.--.

Column 16, Line 9, change "signals" to --signal--.

Column 18, Line 42, change "plurally" to --plurality--.

Column 18, Line 45, change "In" to --in--.

Signed and Sealed this

Eighteenth Day of September, 2007

JON W. DUDAS
*Director of the United States Patent and Trademark Office*